United States Patent [19]

Forster et al.

[11] 3,828,346

[45] Aug. 6, 1974

[54] PCM TRANSMISSION SYSTEM

[75] Inventors: Daniel Emile Forster, Suresnes; Jean Perrault, Loubeciennes, both of France

[73] Assignee: International Standard Electric Corporation, New York, N.Y.

[22] Filed: Mar. 14, 1973

[21] Appl. No.: 341,221

[30] Foreign Application Priority Data

May 30, 1972 France ............................ 72.19338

[52] U.S. Cl......... 340/347 DD, 179/15 AP, 325/38, 340/349

[51] Int. Cl.......................... H04l 15/00, G06f 5/00

[58] Field of Search... 340/347 DD, 349, 146.1 AB; 235/154; 179/15 AP, 15.55; 325/38 R, 38 A, 58, 141; 178/68, 69.5 R

[56] References Cited

UNITED STATES PATENTS

| | | | |
|---|---|---|---|
| 3,300,774 | 1/1967 | Chatelon et al. | 340/347 |
| 3,302,193 | 1/1967 | Sipress | 340/347 |
| 3,358,083 | 12/1967 | Helm | 178/50 |
| 3,502,810 | 3/1970 | Aaron et al. | 178/68 |
| 3,537,100 | 10/1970 | Barjot et al. | 340/347 |

*Primary Examiner*—Malcolm A. Morrison
*Assistant Examiner*—Vincent J. Sunderdick
*Attorney, Agent, or Firm*—John T. O'Halloran; Menotti J. Lombardi, Jr.; Alfred C. Hill

[57] ABSTRACT

This relates to a PCM transmission system employing alternate polarity (bipolar) transmission having a reduction of disparity. This is accomplished by employing the techniques of U.S. Pat. No. 3,300,774 and copending application Ser. No. 252,112, filed May 10, 1972, now U.S. Pat. No. 3,783,383, issued Jan. 1, 1974. In U.S. Pat. No. 3,300,774 the disparity is reduced by complementing a normal bipolar PCM word if the number of binary 1 bits in a word are less than n/2, where n is equal to the number of bits per PCM word. An extra bit is added to the complemented word to indicate to the receiver that the word has been complemented. This extra digit reduced the amount of information bits, or required an increase in transmission rate to maintain the same amount of information bits. This disadvantage was overcome by the above cited copending application by providing two adjacent pulses of the same polarity to indicate a complemented PCM word which is a violation of the alternate polarity rule as found in bipolar PCM. This latter arrangement has the disadvantage that a D.C. component greater than zero is introduced. The present invention overcomes this disadvantage by providing adjacent polarity violations with opposite polarity, for instance, one polarity violation is positive and the next adjacent polarity violation is negative.

20 Claims, 8 Drawing Figures

PCM TRANSMISSION SYSTEM

BACKGROUND OF THE INVENTION

This invention relates to a word synchronization method for a pulse code modulation (PCM) transmission system and, in particular, a method applicable to an alternate polarity transmission with a reduction of disparity being effected by complementing those bipolar PCM words having less than $n/2$ binary 1 bits per PCM word, where n is equal to the number of bits per PCM word, with the complemented PCM word being indicated by a polarity violation of the bipolar rule.

Alternate polarity transmission consists in sending pulses of alternate positive ("+" level) and negative ("—" level) polarities corresponding to the binary 1's of a n-bit binary word, while a zero level corresponds to binary 0's. The final result is that the mean value of the D.C. line level is zero.

In the originating station, a local clock or "time base HA" defines a succession of equal bit time slots, each slot being associated with the transmission of a bit, while each group of n consecutive bits determines a "word time."

During the transmission, the pulses undergo amplitude and phase distortions making it necessary to regenerate them by means of repeaters placed in the line when the latter is long and in the terminating station.

It is well known that in a regenerative repeater, pulses are reshaped and applied to a retiming circuit which provides signals defining the mean pulse time position or "time base HJ."

One method of realizing this retiming is to synchronize the frequency of signals delivered by a local clock with that of the received signals by means of a phase locked loop.

It is well known that the effectiveness of such a synchronization increases with the average number of transitions in the received signal.

Miscellaneous coding methods have been devised for increasing these transitions, namely, to reduce code disparity. U.S. Pat. No. 3,300,774, whose disclosure is incorporated by reference, in particular, describes a transmission method by which each binary word is transmitted either in direct or complemented form depending on whether the number of pulses or binary 1's contained in the word is greater or equal to $n/2$, or less than $n/2$, respectively. Moreover, during reception, in order to detect whether the word has been transmitted in direct or complemented form, an additional bit, or check bit, is associated with each complemented word.

This method, however, has the drawback of requiring increased transmission speed if the same information transmission capacity is to be maintained, or a reduction in the amount of information, owing to the fact that an additional bit has to be transmitted.

In order to solve this problem, copending application Ser. No. 252,112, filed May 10, 1972, now U.S. Pat. No. 3,783,383, issued Jan. 1, 1974. In U.S. Pat. No. 3,300,774, whose disclosure is incorporated herein by reference, describes a method in which a complemented word is signalled by violating the pulse polarity alternation rule. Thus, if a word W is complemented and the final pulse of the preceding word (U —1) is positive, the first pulse of the word W corresponding to a binary 1 after complementation, will be positive, whereas according to the alternation rule, it should be negative. On reception, the detection of a pair of consecutive or adjacent pulses of the same polarity controls the complementation of the received word.

This type of signalling by violation of the polarity alternation rule introduces a D.C. (direct current) component in the transmitted signal spectrum, while alternate polarity transmission succeeded in totally eliminating such a D.C. component in the case of voice signals.

SUMMARY OF THE INVENTION

In order to eliminate this D.C. component while maintaining the property of disparity reduction, this invention proposes a transmission method with alternate polarity violations, namely, transmission in which the polarity of the two adjacent pulses providing a given polarity violation is opposite to the polarity of the two adjacent pulses providing the preceding polarity violation.

In both of the above mentioned methods of alternate polarity and violated polarity transmission, the local clock used in the receiving equipment must be locked with the received signals so as to identify the different bit slots of the received words. This invention concerns more particularly a word synchronization procedure whereby the bit time slots signals $m$1, $m$2 . . . $mn$ delivered by the clock are synchronized with the receiving time of the first, second . . . $n$th bit of the word.

Therefore, an object of this invention is to provide a transmission system with alternate polarity and polarity violation enabling the elimination of the D.C. component in the transmitted signal spectrum.

Another object of the present invention is to provide a word synchronization circuit for a PCM transmission system in which signalling information is transmitted by single or one polarity or alternate polarity violations.

A feature of the present invention is the provision of a pulse code modulation transmission system employing alternate polarity transmission of n-bit pulse code modulation words and having reduced disparity and a zero direct current component, where n is an integer greater than one, comprising: an input for the code words; first means coupled to the input to produce a first control signal for each of the code words having a number of binary 1 bits less than $n/2$; second means coupled to the first means responsive to the first control signal to complement each of the code words producing the first control signal; third means coupled to the first and second means to produce a polarity violation of the alternate polarity transmission for each of the complemented code words, the third means producing adjacent ones of the polarity violation with opposite polarity; fourth means coupled to the third means to detect the polarity violations and produce a second control signal in response to each of the polarity violations; and fifth means coupled to the fourth means responsive to the second control signal to complement the complemented code words to return the complemented code words to their original form as present at the input.

Another feature of the present invention is the provision of a pulse code modulation transmission circuit employing alternate polarity transmission of n-bit pulse code modulation words and having reduced disparity and a zero direct current component, where n is an integer greater than one, comprising: an input for the code words; first means coupled to the input to produce a control signal for each of the code words having a number of binary 1 bits less than $n/2$; second means coupled to the first means responsive to the control signal to complement each of the code words producing the control signal; and third means coupled to the first and second means to produce a polarity violation of the alternate polarity transmission for each of the complemented code words, the third means producing adjacent ones of the polarity violations with the opposite polarity.

Still another feature of the present invention is the provision of a pulse code modulation receiving circuit receiving alternate polarity n-bit pulse code modulation words including the code words in direct and complemented form with the code words in complemented form being signalled by alternate polarity polarity violations of the alternate polarity code words, where n is equal to an integer greater than one, comprising: an input for the code words; first means coupled to the input to detect the polarity violations and produce a control signal in response to each of the polarity violations; and second means coupled to the first means responsive to the control signal to complement the code words in complemented form to return the code words in complemented form to their original form prior to complementing in a transmission circuit.

A further feature of the present invention is the provision of a word synchronization circuit for a pulse code modulation receiving circuit receiving alternate polarity n-bit pulse code modulation words including the code words in direct and complemented form with the code words in complemented form being signalled by a selected one of single polarity polarity violations of the alternate polarity code words and alternate polarity polarity violations of the alternate polarity code words and alternate polarity polarity violations of the alternate polarity code words, where n is equal to an integer greater than one, comprising: an input for the code words; a polarity detector coupled to the input to detect the polarity violations and to produce a negative output signal when the polarity violations are negative and a positive output signal when the polarity violations are positive; first logic circuitry coupled to the polarity detector responsive to the negative and positive output signals to produce a control signal; a shift register having $p$ stages coupled to the input to delay the bits of the code words by $p$ bit times, where $p$ is an integer less than $n$; a clock circuit including a counter to produce timing signals defining bit times $m1, m2 \dots mn$; and second logic circuitry coupled to the first logic circuitry and the counter to set the counter to a bit time $m$B when the control signal appears in the time interval bounded by bit times $m1$ and $m(B-1)$, inclusive, where B is equal to $n/2$ and p is equal to$((n12)+1)$ when $n$ is an even integer for signalling by the alternate polarity violations and where B is equal to $((n/2)+1)$ and $p$ is equal to $n/2$ when $n$ is an even integer for signalling by the single polarity polarity violations.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

A PCM transmission system to which this invention is applicable is designed for transmitting n-bit words associated either with a single channel or with a plurality of channels where the information thereof is transmitted sequentially in time multiplex.

For purposes of explanation only, the following description assumes a PCM system in which $n = 8$.

Figure 1:
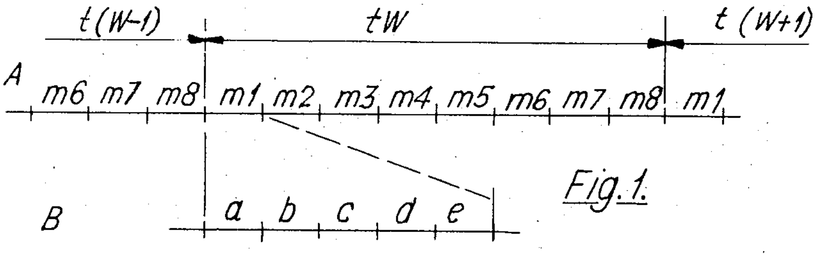
FIG. 1 illustrates the clock signals in accordance with the principles of the present invention.

FIG. 1 illustrates the clock signals used for transmission and reception, in which (1) Curve A, FIG. 1 illustrates bit time signals $m1, m2 \dots m8$ defining the time intervals relating to each bit of the bipolar PCM word, wherein the time intervals related to the words $(W-1)$, W, $(W+1)$ are referred to as $t(W-1)$, $t$W, $t(W+1)$, and (2) Curve B, FIG. 1 illustrates "thin" time slot signals $a,b,c,d$ and $e$, which divide each bit time into five equal intervals.

As mentioned hereinabove, this invention is applicable to a transmission characterized by the three following points: (1) transmission in reduced disparity code wherein a word comprising less than $n/2$ binary 1's is complemented, (2) alternate polarity transmission wherein pulses with alternate positive and negative polarities correspond to successive binary 1's, which is the alternate polarity rule, and (3) violated polarity transmission, in which the presence of a complemented word is signalled by violating the alternate polarity rule. In the case of single or one polarity polarity violation as described in the above cited copending application, this violation is made on the first pulse of a complemented word.

In order to facilitate the reading of the following description, it is divided into three parts:

1. Single or one polarity and double or alternate polarity violation transmissions
2. Transmission circuit
3. Receiving circuit

1. Single or One Polarity and Double or Alternate Polarity Violation Transmission Curves A to F of FIG. 2 relate to single or one polarity polarity violation transmissions as described in the above cited copending application for three consecutive words $(W-2)$, $(W-1)$, W.

Figure 2:
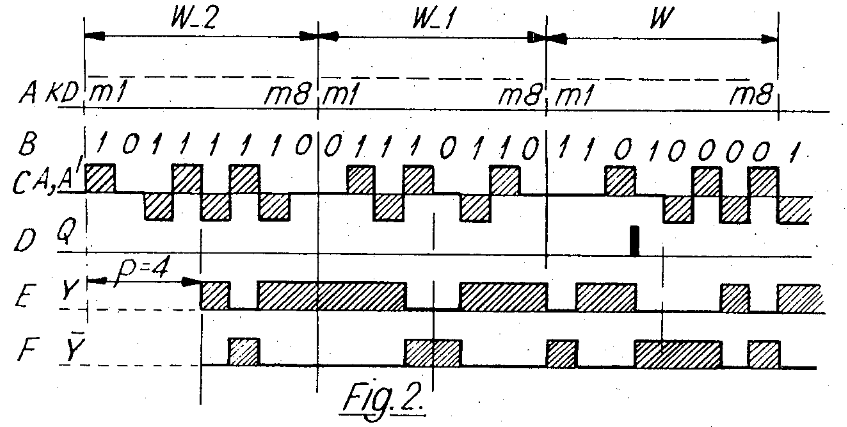
FIG. 2 illustrates signals in the transmission and receiving circuits of FIGS. 4 and 5 when information is transmitted with single polarity violations.

Curve A, FIG. 2 illustrates these three words and their associated bit times.

Curve B, FIG. 2 illustrates the transmitted code. If the number of binary 1 bits in a word is designated as $n1$, $n1$ is greater than three for the words $(W-2)$ and $(W-1)$ and $n1$ is equal to or less than three for the word W so that this word must be complemented as is seen in Curve C, FIG. 2 which represents full-baud signals transmitted in alternate polarity.

The violation of the alternate polarity rule appears on the first pulse of the word W, namely, at bit time $m3$.

Thus, it can be seen that (1) a word in which n1 is greater than three is transmitted in direct form and it contains 4 to 8 pulses (representing binary 1's), and (2) a word in which $n1$ is equal to or less than three is transmitted in complemented form and it contains 5 to 8 pulses (representing binary 0's). This implies that the complement contains at least one pulse in the first half of the complemented word defined by the time interval n1 to $m4$.

As mentioned hereinabove, this transmission procedure introduces a D.C. component. The present invention eliminates this component by prescribing that the polarity violation $VPx$ will apply to a pair of adjacent pulses having a polarity opposite to the polarity of a pair of adjacent pulses which indicated the preceding polarity violation $VP(x-1)$.

Figures 3, 8:
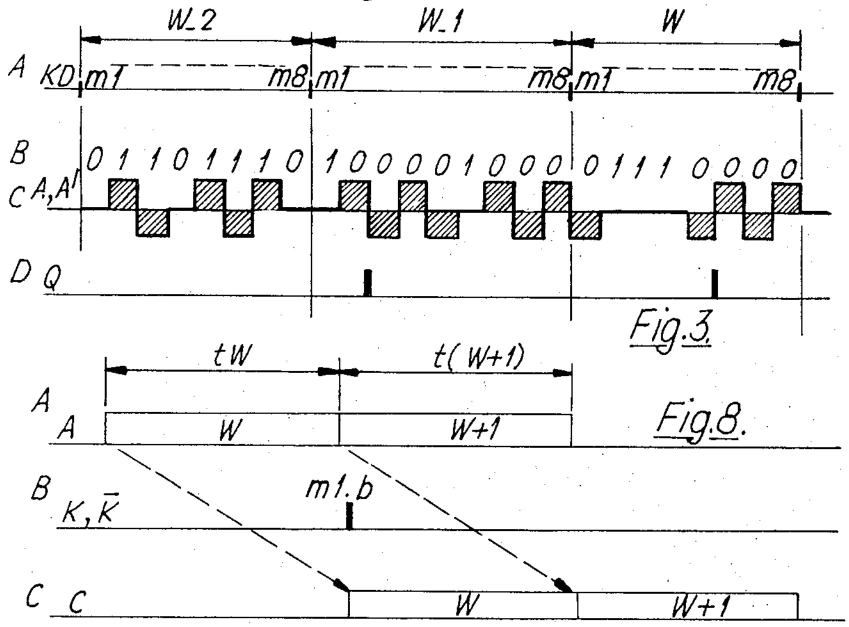
FIG. 3 illustrates in the transmission and receiving circuits of FIGS. 4 and 5 when information is transmitted with alternate (or double) polarity violations.
FIG. 8 illustrates signals in the transmission circuit of FIG. 4.

Curves A to D of FIG. 3 illustrate this alternate polarity or "double" polarity violation transmission.

Curve A, FIG. 3 illustrates the time slots associated with three consecutive words $(W-2)$, $(W-1)$, W of which words $(W-1)$ and W must be complemented as may be seen by examining the code values shown in Curve B, FIG. 3. For word $(W-1)$, the polarity violation is signalled by its first pulse, occurring at time $m2$. For word W, the first pulse which appears at time $m1$ should, in order to signal the polarity violation, be of the same sign as the final pulse of word $(W-1)$, i.e. positive. This is not possible because the preceding polarity violation was indicated by a pair of adjacent positive pulses. Thus, the first pulse of word W must be negative and the polarity violation will be signalled by the second pulse, which is also negative, appearing in this example, at $m5$.

2. Transmission Circuit 2.1. General Description

Figure 4:
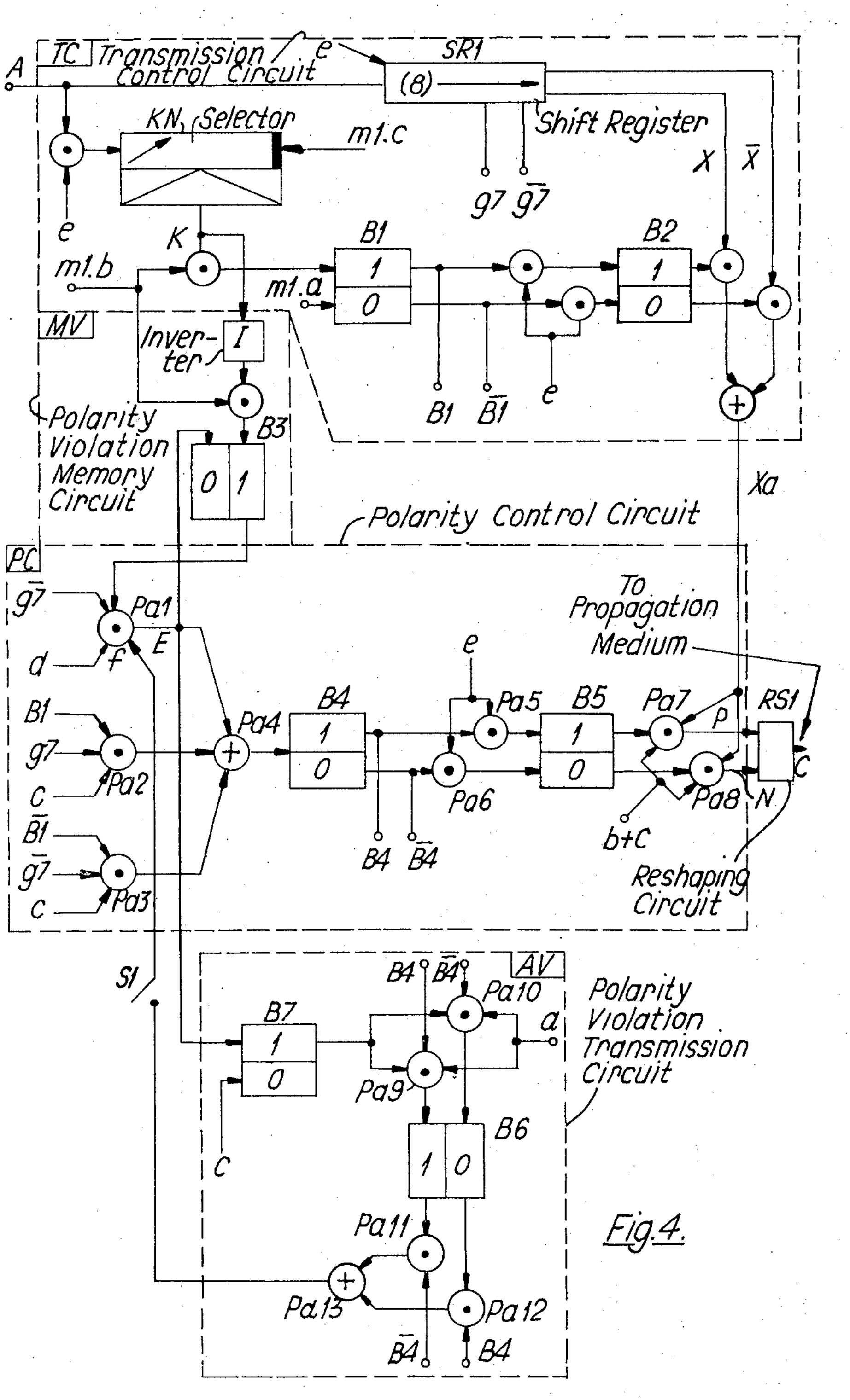
FIG. 4 is a block diagram of the transmission circuit in accordance with the principles of the present invention.

FIG. 4 is a block diagram of a transmission circuit in accordance with the principles of the present invention which can be divided into two parts.

The first part includes the alternate polarity and single polarity violation signal transmission circuits as disclosed in the above cited copending application. These circuits include (1) the transmission control circuit TC including primarily the shift register SR1 (capacity $n=8$ bits), the selector KN having a counter and a decoding logic circuit which delivers a signal K for $n1$ greater than three and flip flops B1 and B2; (2) the polarity violation memory circuit MV including flip flop B3; (3) the polarity control circuit PC including flip flops B4 and B5, AND gates $Pa1$ to $Pa3$ and $Pa5$ to $Pa8$ and OR gate $Pa4$; and (4) the reshaping circuit RS1.

The second part includes the polarity violation transmission circuit AV including flip flops B6 and B7, AND gates $Pa9$ to $Pa12$ and OR gate $Pa13$.

TABLE I below, in which the abbreviation "VP" denotes "violation of polarity," indicates the functions carried out by flip flops B1 to B6.

TABLE I

Functions carried out by the flip flops of the transmission circuit

| Flip-flops | Function | Rate of change of State |
|---|---|---|
| B1, B2 | Condition 1: direct transmission Condition 0: complemented transmission | Word time |
| B3 | Polarity violation indication | Zero reset as soon as the VP is executed |
| B4, B5 | Indication of polarity of the following pulse | Bit time |
| B6 | Polarity of preceding violation | Word time |

2.2 Operation of the Transmission Circuits for Single or One Polarity Polarity Violation The operation of these circuits, described in the above cited copending application is briefly described hereinbelow.

At each pulse, (digit 1) of word W which is applied at input A, selector KN advances by one step at the thin time $e$. At the end of word time $tW$, a signal K is generated if $n1$ is greater than three and, at the beginning of the following word time $T(W+1)$, the following logical conditions are present.

$$m1.a \rightarrow \overline{B1},$$
$$K.m1.b \rightarrow B1, \text{ or } \overline{K}.m1.b \rightarrow B3, \quad (1)$$
$$B1.e \rightarrow B2, \text{ or } \overline{B1}.e \rightarrow \overline{B2},$$

where the symbol "." represents a logical AND function.

At the same time, the value of the $n$ bits of word W is transferred into register SR1.

It can be seen that, at time $t(W+1).m1.e$ (1) the value of the eight bits of the word W is available in SR1; and (2) the state of flip flop B2 indicates the transmission mode of this word (see TABLE I). If the direct and complemented outputs of SR1 are designated as X and $\overline{X}$, they are selected by condition B2 and condition $\overline{B2}$, respectively. Equation (1) above shows that flip flop B3 sets in the binary 1 state for condition $\overline{K}$, i.e. $n1$ equal to or less than three. This means that the flip flops B1 and B2 are in the binary 0 state to order the transmission of the complemented word W, or "transmission of word $\overline{W}$," and that this complementing must be signalled by a polarity violation on the first pulse of word $\overline{W}$.

As may be seen from FIG. 8, where Curve A illustrates the time for two consecutive words W, $(W+1)$, Curve B illustrates the processing time $m1.b$ of signal K or $\overline{K}$ and Curve C illustrates the transmission time, a word W received on input A in time tW is transmitted to output C at time $t(W+1)$ with a delay which is slightly greater than a word time.

Circuit PC simultaneously controls alternate polarity transmission and simple polarity violation (condition B3) of the first pulse of a word $\overline{W}$.

Polarity control is carried out by means of flip flop B4, which is connected as a divider and which changes state at digit time $c$ of each transmission time of a pulse via AND gates $Pa2$ and $Pa3$. For polarity violation, i.e., when condition B3 appears, flip flop B4 toggles a second time at the digit time d which follows immediately (signal E produced by AND gate P$a$1) so that its state remains the same for two consecutive pulses.

The state of flip flop B4 is transferred at thin time e via AND gates P$a$5 and P$a$6 to flip flop B5, whose state determines the polarity of the pulse to be transmitted (binary 1 state = positive polarity P; binary 0 state = negative polarity N).

Pulses appearing on the output conductor X$a$ of circuit TC (binary 1's of a word W or $\overline{W}$) are applied to AND gates P$a$7 and P$a$8, which are also connected to the outputs of flip flop B5 so that signals P and N are applied alternately to circuit RS1 at times $b$ and $c$. Circuit RS1 is designed to transmit, at its output C, "full-baud" signals (pulses with a duration of one bit time) or "half-baud" signals (pulses with a duration of half a bit time).

The changes of state of flip flop B4 are controlled by signals B1, $\overline{\textbf{B1}}$, B3, and also by signals $\overline{g7}$ and $g$7, these latter signals defining the value of the first bit to be transmitted, which is stored in the next to last stage of shift register SR1 at the bit time prior to shift register being full, that is, containing the word to be transmitted. It can be seen that condition $g$7 indicates that a pulse must be transmitted at the following bit time when a word W has to be transmitted and that condition $\overline{g7}$ indicates that a pulse must be transmitted at the following bit time when a word $\overline{W}$ has to be transmitted. Flip flop B4 has its state changed for the following conditions: $a$) transmission of a word W: condition $\overline{\textbf{B1}}.\overline{g7}.c$ (AND gate P$a$2); $b$) transmission of a word $\overline{W}$: condition B1.$g$7.$c$ (AND gate P$a$3); and $c$) polarity violation on the first pulse of a word $\overline{W}$: conditions B3.$\overline{g7}$.$d$ = E and E → $\overline{B3}$ (AND gate P$a$1, of which input $f$ is not used).

2.3 Operation of Transmission Circuit with Alternate Polarity Polarity Violations The circuit of FIG. 4 to control the alternate polarity polarity violation transmission operates in the following manner.

If a polarity violation must take place (condition B3), signal E delivered by gate Pa1 is stored, until the following digit time $c$, in flip flop B7. The logic condition B7.a energizes AND gates P$a$9 and P$a$10 and the state of flip flop B4 is transferred to flip flop B6. Flip flop B6 thus contains the polarity information of the last violation VP$x$. (condition B6 = VP$x$ positive; condition $\overline{\textbf{B6}}$ = VP$x$ negative).

As set forth in Section 1, the alternating rule of polarity violations requires that the following violation VP ($x$ + 1) occurs only after the transmission of a pulse having a polarity opposite to that of VP$x$ (see Curve C, FIG. 3). This condition is satisfied when flip flops B4 and B6 are in opposite states.

For the state control of flip flop B4, AND gate P$a$l includes, besides the input to which signals B3, $g$7, $d$ are applied, an input $f$ connected to the output of the OR gate Pa13 through switch S1, giving the logic condition E = (B4.$\overline{\text{B6}}$ + $\overline{\text{B4}}$.B6).B3.$\overline{g7}$.$d$, where the symbol "+" represents a logic OR function.

3 Receiving Circuit 3.1 General Description

Figure 5:
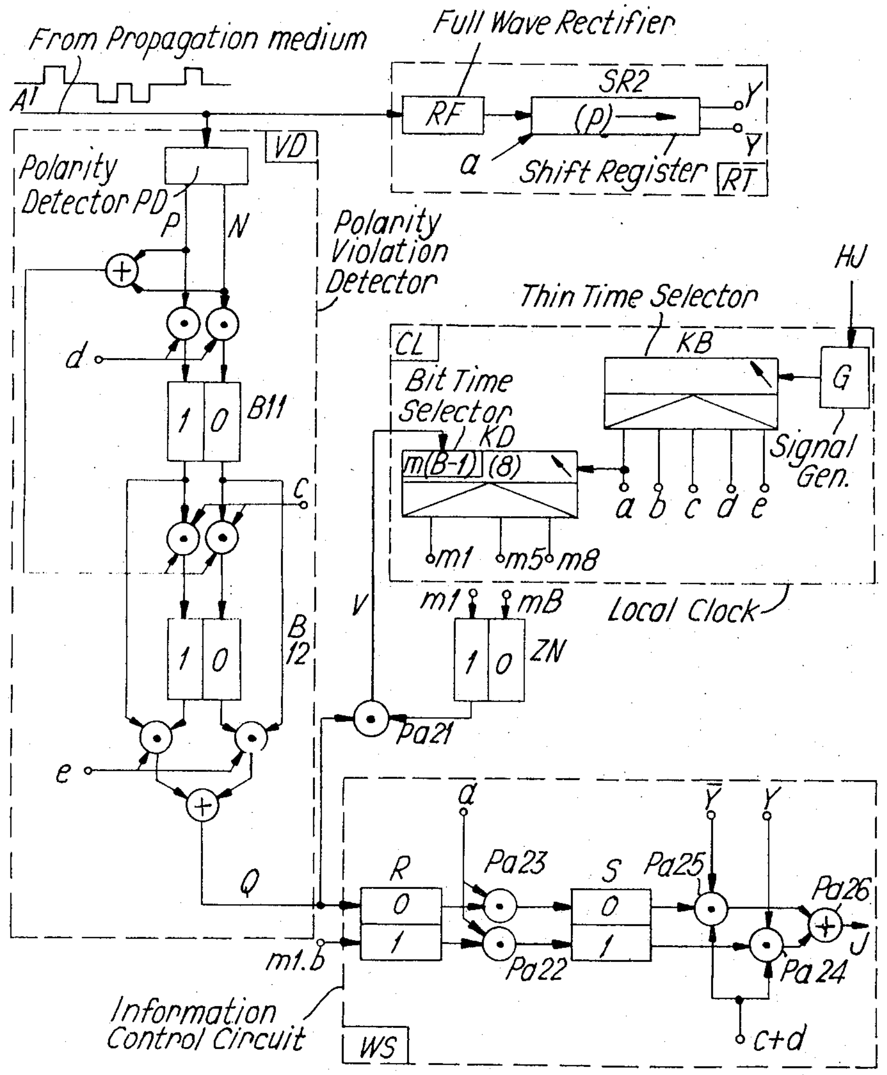
FIG. 5 is a block diagram of the receiving circuit in accordance with the principles of the present invention.

FIG. 5 illustrates a block diagram of the receiving circuit in accordance with the principles of the present invention. This circuit receives, on input A', which is coupled by a propagation medium to output C of FIG. 4 pulses which are reshaped, and synchronized to bit time signals of time base HJ. These pulses are presented in a shape identical to that of the pulses delivered by the transmission circuit (Curve C, FIG. 2 and Curve C, FIG. 3).

The receiving circuit is divided into two parts.

The first part includes the receiving circuits for alternate polarity and single or one polarity polarity violation signals as described in the above cited copending application. These circuits are (1) the local clock CL with the signal generator G synchronized to time base HJ produced in a circuit which is not shown, the thin time selector KB and the bit time selector KD both of which include a counter and a decoding logic circuit; (2) the retiming circuit RT, containing a full-wave rectifier RF and the p-bit shift register SR2; (3) the polarity violation detector circuit VD, including flip flops B11 and B12 and the polarity detector PD delivering signals P (reception of a positive polarity pulse) or N (reception of a negative polarity pulse); and (4) the information control circuit WS including flip flops R and S, AND gates P$a$22 to P$a$25 and OR gate P$a$26.

The second part includes the word synchronization circuits according to the present invention including the synchronization search flip flop ZN and its AND control gate P$a$21.

3.2 Operation of the Receiving Circuits

The operation of these circuits is described below in connection with circuit of FIG. 5, and the curves of FIGS. 2 and 6 and FIGS. 2.$a$ to 2.$f$.

The signals received at input A' are applied to detector VD and circuit RT.

Figure 6:
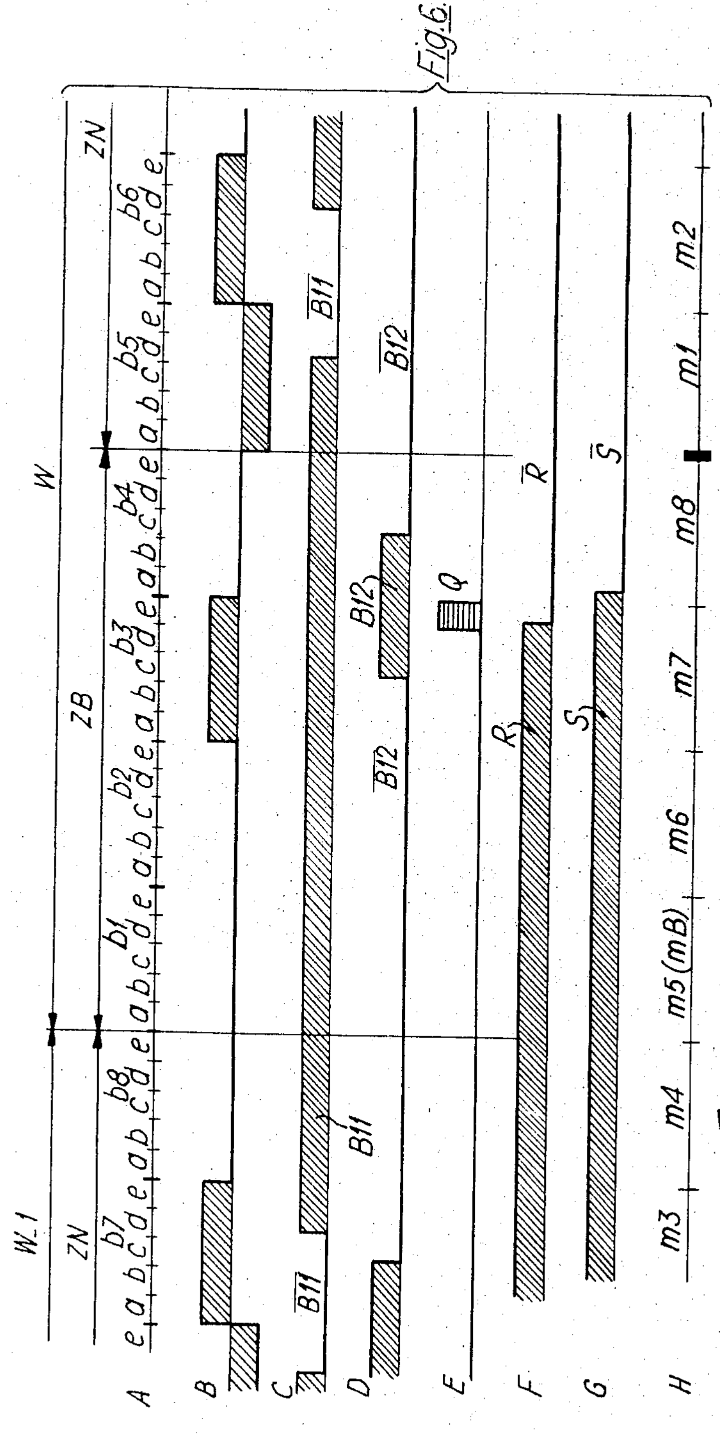
FIG. 6 illustrates signals in the receiving circuit of FIG. 5 when information is transmitted with single polarity violations.

In detector VD, flip flop B11 stores the polarity of a received pulse and this information is transferred to flip flop B12 on receipt of the next pulse (the next pulse can be received with a delay of one to three bit times, see Curve C, FIG. 2). In these conditions, if the alternating polarity rule has been violated, both flip flops will be in the same condition, at least during the thin times $d$ and $e$, as may be seen in Curves A to C, FIG. 6, and a polarity violation signal Q is obtained for the logical condition:

Q = (B11.B12 + $\overline{\text{B11}}$.$\overline{\text{B12}}$).$e$ (see Curve D, FIG. 2 and Curve E, FIG. 6).

In circuit RT, the input signals (Curve C, FIG. 2) are applied to full-wave rectifier RF whose output is connected to shift register SR2. The latter includes a direct output Y and a complemented output $\overline{Y}$, upon which appear NRZ non-return-to-zero signals, shown respectively in Curves E and F, FIG. 2 and 2.$f$. These signals are delayed by p bit times with respect to the signals applied to input A' (Curve C, FIG. 2).

For the description of circuit WS, it may be assumed that the time base HJ (signals $M$1 to $m$8) is perfectly synchronized with the received pulses, i.e., the information appearing on output J represents the value of the first bit $b$1 of a word at bit time $m$1, etc.

At the beginning of a word time (time $m$1.$b$), flip flop R receives a signal which sets it in binary 1 state, and, as long as a polarity violation is not detected, it remains in this condition (Curve F, FIG. 6). At each thin time $a$, AND gate P$a$22 controls the transfer of the state of flip flop R to flip flop S, (Curve G, FIG. 6). Thus, the presence of condition S shows that a word W is received (word transmitted in direct form).

On the other hand, as soon as a polarity violation is detected, flip flop R resets to the binary 0 state at time m1.e and remains in this state until the following time m1.b. This state of flip flop R is transferred into flip flop S via AND gate Pa23 and, thus, the condition $\overline{S}$ denotes that a word $\overline{W}$ is being received (a word transmitted in complemented form).

Curve A, FIG. 6, which concerns single polarity violations, illustrates that the violation pulse belongs to bit b3 and condition $\overline{S}$ occurs at the end of this bit time. In fact, it may belong to bit b4, so that condition $\overline{S}$ occurs, in this case, with a delay of a half-word time with respect to the reception time of this pulse. Thus, the received signals must be delayed by $p = 4$ digit times (see Curves A and H, FIG. 6), so that bit b1 of word $\overline{W}$ may be complemented even if the violation occurs at bit b4. The shift register SR2 provides, at each time a, a new information which lasts a bit time, and the selection of this information is carried out according to the logic equation $J = (Y.S + \overline{Y}.\overline{S}).(c + d)$.

Thus, information provided at output J, in "return to bias" or "return to zero" modulation, corresponds to the true value of the words such as shown in Curve B, FIG. 2.

As seen in Curve C, FIG. 3 the polarity violation pulse may belong to bit b5 in the case of an alternate polarity polarity violation. In this case, $p = 5$ is selected for register SR2.

3.3 Word Synchronization

In the description of Section 3.2, it was assumed that the word synchronization was correct. However, this may not be the case when the system is put into service, or during operations in which the transmission is affected by interference.

For this reason, the present invention provides means to monitor the word synchronization and to reestablish it in case of loss of synchronization.

An alternate polarity and single polarity violation transmission is characterized by the fact that a 8-bit word $\overline{W}$ contains five to eight pulses, so that at least one of them occurs in the first half-word (bits b1 to b4). By comparing Curves A and H, FIG. 6, it will be seen that, when channel synchronization is correct, bits b1 to b4 are received during bit times m5 to m8, which may be called "white zone" ZB, as opposed to the "black zone" ZN which covers bit times m1 to m4. Since two pulses of same polarity belong to two consecutive words (W − 1) and W, only the violation pulse which has permitted the generation of signal Q (Curve D, FIG. 2 or Curve E, FIG. 6) will appear in the white zone of word W in case of correct synchronization.

Figure 7:
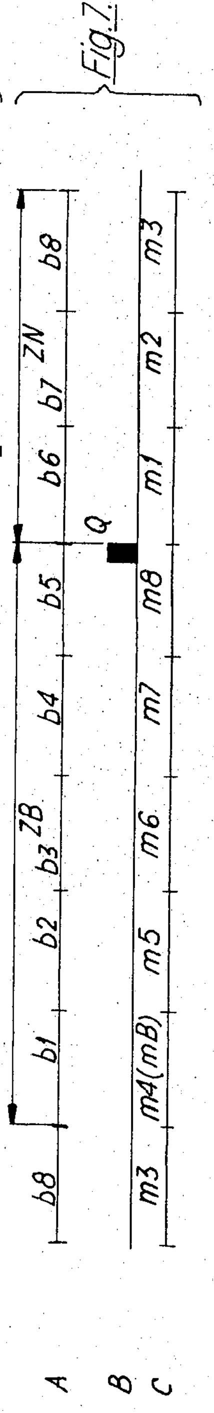
FIG. 7 illustrates signals in the receiving circuit of FIG. 5 when information is transmitted with alternate polarity violations.

In alternate polarity polarity violation transmission, the violation pulse which causes the generation of signal Q may belong to one of the bits b1 to b5. In Curves A to C, FIG. 7, this violation pulse belongs to bit b5, i.e., it is the second pulse of word W. Consequently, the time interval bounded by signals m4 to m8 is the "white zone," and that bounded by signals m1 to m3 is the "black zone" (see Curve C, FIG. 7).

In short, regardless of the type of polarity violation, the "white zone" ZB is that zone in which signal Q appears.

In the present invention, a resynchronization algorithm has been set up as follows: each time a signal Q characterizing a polarity violation appears in the black zone, the bit time counter KD is set into position mB correspondong to the first bit time of the white zone.

This resynchronization is realized by means of AND gate Pa21 and flip flop ZN. Flip flop ZN is set in the binary 0 state by a signal mB marking the beginning of the white zone and in the binary 1 state by a signal n1 marking the beginning of the black zone as may be seen in Curves A and H, FIG. 6 and Curves A and C, FIG. 7. mB = m5 for single or one polarity polarity violations and mB = m4 for alternate polarity polarity violations. The resynchronization signal V = Q.ZN indicates the detection of a polarity violation in the black zone and controls the setting of selector KD in position m(B − 1) at digit time e. At the following digit time a, selector KD provides the bit time signal mB.

TABLE II shows the zone specifications and the capacity p of register SR2.

TABLE II

| Type of polarity violation | Specifications of zones and capacity of register SR2 | | | |
|---|---|---|---|---|
| | Black zone | White zone | mB | p |
| Single | m1–m4 | m5–m8 | m5 | 4 |
| Alternate | m1–m3 | m4–m8 | m4 | 5 |

Two cases of synchronization may be observed (1) the polarity violation pulse is in bit b1 and the resynchronization is immediate; and (2) the polarity violation pulse is in one of the bits b2, b3, b4. In this case, the setting of counter KD in position mB does not bring immediate resynchronization. It results that, at the resynchronization of the word or of one of the following complemented words, the polarity violation is again detected in the black zone, leading to a new setting in position mB. It follows that after receiving a certain number of complemented words providing a signal Q for one of the bits b2, b3, b4, a word is received whose first pulse is in bit b1, ensuring perfect resynchronization.

Calculations show that synchronization is quite rapid. Thus, for eight-bit codes wherein all words have an equal probability of occurrence (1) in the case of single polarity violation, the probability of the appearance of a violation in bit b1 is 0.25 and the mean resynchronization time is 40 word times; and (2) in the case of alternate polarity violation, the mean synchronization time is 31 word times.

While we have described above the principles of our invention in connection with specific apparatus, it is to be clearly understood that this description is made only by way of example and not as a limitation to the scope of our invention as set forth in the objects thereof and in the accompanying claims.

We claim:

1. A pulse code modulation transmission system employing alternate polarity transmission of n-bit pulse code modulation words and having reduced disparity and a zero direct current component, where n is an integer greater than one, comprising:

an input for said code words;

first means coupled to said input to produce a first control signal for each of said code words having a number of binary 1 bits less than n/2;

second means coupled to said first means responsive to said first control signal to complement each of said code words producing said first control signal;

third means coupled to said first and second means to produce a single polarity violation of said alternate polarity transmission for each of said complemented code words, said third means producing adjacent ones of said single polarity violations with opposite polarity, each of said adjacent ones of said single polarity violations with opposite polarity being associated with a different one of adjacent ones of said complemented code words;

fourth means coupled to said third means to detect said polarity violations and produce a second control signal in response to each of said polarity violations; and fifth means coupled to said fourth means responsive to said second control signal to complement said complemented code words to return said complemented code words to their original form as present at said input.

2. A system according to claim 1, wherein said second means includes a time delay means coupled to said input to delay said code words by a time interval equal to n bit times, and logic circuitry coupled to said time delay means and said first means to complement each of said code words producing said first control signal.

3. A system according to claim 2, wherein said time delay means includes a first shift register having n stages.

4. A system according to claim 3, wherein said first means includes a selector coupled to said input to produce said first control signal, a first flip flop, first logic circuitry coupled between said selector and said first flip flop to couple said first control signal to said first flip flop, a second flip flop, second logic circuitry coupled between said first flip flop and said second flip flop to transfer the state of said first flip flop to said second flip flop, and third logic circuitry coupled to said second flip flop and said first shift register to complement said code words during the presence of said first control signal.

5. A system according to claim 4, wherein said third means includes a third flip flop, fourth logic circuitry coupled between said selector and said third flip flop to transfer the complement of said first control signal to said third flip flop, fifth logic circuitry coupled to said third logic circuitry and said fourth logic circuitry to provide said polarity violations for each of said words producing said first control signal and to provide said code words and said complemented code words with said polarity violations for coupling to said fourth means, and sixth logic circuitry coupled to said third flip flop, said fourth logic circuitry and said fifth logic circuitry to store the polarity of a preceding one of said polarity violations to compare the polarity of the first pulse to be transmitted upon occurrence of a new one of said polarity violations with the polarity of said preceding one of said polarity violations, and to provide said new one of said polarity violations with a polarity opposite to the polarity of said preceding one of said polarity violations.

6. A system according to claim 5, wherein said fourth means includes a polarity detector coupled to said third means to detect said polarity violations and to produce a negative output signal when said polarity violations are negative and a positive output signal when said polarity violations are positive, seventh logic circuitry coupled to said polarity detector responsive to said negative and positive output signals to produce said second control signal, a retiming circuit coupled to said third means to delay said bits of said code words by $p$ bit times, where $p$ is an integer less than $n$, and a clock circuit including a counter to produce timing signals defining bit times $m1$, $m2 \ldots mn$.

7. A system according to claim 6, wherein said retiming circuit includes a second shift register having p stages.

8. A system according to claim 7, wherein said fifth means includes eighth logic circuitry coupled to said seventh logic circuitry to provide at the output thereof said code words when said second control signal is absent and a complement of said complemented code words when said second control signal is present.

9. A system according to claim 8, further including a word synchronization circuit including ninth logic circuitry coupled to said seventh logic circuitry and said counter to set said counter to a bit time $m$B when said second control signal appears in the time interval bounded by bit times $m1$ and $m(B-1)$, inclusive, where B is equal to $n/2$ and $p$ is equal to $((n/2)+1)$ when $n$ is an even integer.

10. A pulse code modulation transmission circuit employing alternate polarity transmission of n-bit pulse code modulation words and having reduced disparity and a zero direct current component, where $n$ is an integer greater than one, comprising:

an input for said code words;

first means coupled to said input to produce a control signal for each of said code words having a number of binary 1 bits less than $n/2$;

second means coupled to said first means responsive to said control signal to complement each of said code words producing said control signal; and third means coupled to said first and second means to produce a single polarity violation of said alternate polarity transmission for each of said complemented code words, said third means producing adjacent ones of said single polarity violations with opposite polarity, each of said adjacent ones of said single polarity violations with opposite polarity being associated with a different one of adjacent ones of said complemented code words.

11. A transmission circuit according to claim 10, wherein said second means includes a time delay means coupled to said input to delay said code words by a time interval equal to *n* bit times, and logic circuitry coupled to said time delay means and said first means to complement each of said code words producing said control signal.

12. A transmission circuit according to claim 11, wherein said time delay means includes a first shift register having *n* stages.

13. A transmission circuit according to claim 12, wherein said first means includes a selector coupled to said input to produce said control signal, a first flip flop, first logic circuitry coupled between said selector and said first flip flop to couple said control signal to said first flip flop, a second flip flop, second logic circuitry coupled between said first flip flop and said second flip flop to transfer the state of said first flip flop to said second flip flop, and third logic circuitry coupled to said second flip flop and said first shift register to complement said code words during the presence of said control signal.

14. A transmission circuit according to claim 13, wherein said third means includes a third flip flop, fourth logic circuitry coupled between said selector and said third flip flop to transfer the complement of said control signal to said third flip flop, fifth logic circuitry coupled to said third logic circuitry and said fourth logic circuitry to provide said polarity violations for each of said words producing said control signal and to provide said code words and said complemented code words with said polarity violations for coupling to said fourth means, and sixth logic circuitry coupled to said third flip flop, said fourth logic circuitry and said fifth logic circuitry to store the polarity of a preceding one of said polarity violations, to compare the polarity of the first pulse to be transmitted upon occurence of a new one of said polarity violations with the polarity of said preceding one of said polarity violations, and to provide said new one of said polarity violations with a polarity opposite to the polarity of said preceding one of said polarity violations.

15. A pulse code modulation receiving circuit receiving alternate polarity n-bit pulse code modulation words including said code words in direct and complemented form with each of the adjacent ones of said code words in complemented form being signalled by a different one of adjacent opposite polarity single polarity violations of said alternate polarity code words, where n is equal to an integer greater than one, comprising:

an input for said code words;

first means coupled to said input to detect said polarity violations and produce a control signal in response to each of said polarity violations; and second means coupled to said first means responsive to said control signal to complement said code words in complemented form to return said code words in complemented form to their original form prior to complementing in a transmission circuit.

16. A receiving circuit according to claim 15, wherein said first means includes a polarity detector coupled to said input to detect said polarity violations and to produce a negative output signal when said polarity violations are negative and a positive output signal when said polarity violations are positive, first logic circuitry coupled to said polarity detector responsive to said negative and positive output signals to produce said control signal, a retiming circuit coupled to said input to delay said bits of said code words by p bit times, where p is an integer less than n, and a clock circuit including a counter to produce timing signals defining bit times *m*1, *m*2 . . . *mn*.

17. A receiving circuit according to claim 16, wherein said retiming circuit includes a second shift register having p stages.

18. A receiving circuit according to claim 17, wherein said second means includes second logic circuitry coupled to said first logic circuitry to provide at the output thereof said code words in direct form when said control signal is absent and a complement of said code words in complemented form when said control signal is present.

19. A receiving circuit according to claim 18, further including a word synchronization circuit including third logic circuitry coupled to said first logic circuitry and said counter to set said counter to a bit time *m*B when said control signal appears in the time interval bounded by bit times *m*1 and *m*(B − 1), inclusive, where B is equal to *n*/2 and *p* is equal to ((*n*/2) + 1) when *n* is an even integer.

20. A word synchronization circuit for a pulse code modulation receiving circuit receiving alternate polarity n-bit pulse code modulation words including said code words in direct and complemented form with each of the adjacent ones of said code words in complemented form being signalled by a selected one of single polarity polarity violations of said alternate polarity code words and a different one of adjacent opposite polarity single polarity violations of said alternate polarity code words, where *n* is equal to an integer greater than one, comprising:

an input for said code words;

a polarity detector coupled to said input to detect said polarity violations and to produce a negative output signal when said polarity violations are negative and a positive output signal when said polarity violations are positive;

first logic circuitry coupled to said polarity detector responsive to said negative and positive output signals to produce a control signal;

a shift register having $p$ stages coupled to said input to delay said bits of said code words by $p$ bit times, where $p$ is an integer less than n;

a clock circuit including a counter to produce timing signals defining bit times $m1, m2 \ldots mn$; and second logic circuitry coupled to said first logic circuitry and said counter to set said counter to a bit time $m$B when said control signal appears in the time interval bounded by bit times $m1$ and $m(B-1)$, inclusive, where B is equal to $n/2$ and $p$ is equal to $((n/2)+1)$ when $n$ is an even integer for signalling by said opposite polarity single polarity violations and where B is equal to $((n/2)+1)$ and $p$ is equal to $n/2$ when $n$ is an even integer for signalling by said single polarity polarity violations.

* * * * *